(12) United States Patent
Tokiwa et al.

(10) Patent No.: US 6,669,771 B2
(45) Date of Patent: Dec. 30, 2003

(54) BIODEGRADABLE RESIN COMPOSITIONS

(75) Inventors: Yutaka Tokiwa, Tsukuba (JP); Akihito Tsuchiya, Shiga (JP)

(73) Assignees: National Institute of Advanced Industrial Science and Technology, Tokyo (JP); Allmighty Co., Ltd., Hyogo (JP); Yukata Tokiwa, Ibaraki (JP)

( * ) Notice: Subject to any disclaimer, the term of this patent is extended or adjusted under 35 U.S.C. 154(b) by 0 days.

(21) Appl. No.: 10/149,276

(22) PCT Filed: Dec. 8, 2000

(86) PCT No.: PCT/JP00/08725

§ 371 (c)(1),
(2), (4) Date: Sep. 13, 2002

(87) PCT Pub. No.: WO01/42367

PCT Pub. Date: Jun. 14, 2001

(65) Prior Publication Data

US 2003/0079654 A1 May 1, 2003

(30) Foreign Application Priority Data

Dec. 8, 1999 (JP) ............................................. 11/349437

(51) Int. Cl.⁷ ........................ C08L 101/16; C08L 5/14; C08L 67/00
(52) U.S. Cl. ................ 106/162.7; 106/15.05; 106/16; 106/162.1; 106/205.01; 264/330; 264/331.11; 424/78.09; 523/122; 524/27; 524/55; 524/56
(58) Field of Search .......................... 106/162.1, 162.7, 106/205.01, 15.05, 16; 524/27, 55, 56; 264/330, 331.11; 523/122; 424/78.09

(56) References Cited

U.S. PATENT DOCUMENTS

| | | | |
|---|---|---|---|
| 5,532,350 A | 7/1996 | Cottrell et al. ................. 536/76 |
| 5,545,485 A | * 8/1996 | Hashitani et al. ......... 428/423.1 |
| 5,691,403 A | * 11/1997 | Shitaohzono et al. ......... 524/47 |
| 5,744,516 A | * 4/1998 | Hashitani et al. ............ 523/124 |
| 6,515,054 B1 | * 2/2003 | Matsushita et al. .......... 524/167 |

FOREIGN PATENT DOCUMENTS

| | | |
|---|---|---|
| EP | 0 173 555 | 3/1986 |
| JP | 51-133440 | 11/1976 |
| JP | 09-268201 | 10/1997 |
| JP | 11-46722 | 2/1999 |
| JP | 2000-325047 | 11/2000 |
| WO | WO 97 31979 | 9/1997 |

OTHER PUBLICATIONS

Hardaning Pranamuda, et al., Polylactide Degradation by an Amycolatopsis sp., Applied and Environmental Microbiology, Apr. 1997, pp 1637–1640.

Hardaning Pranamuda, et al., Degradation of poly (L–lactide) by strains belonging o genus Amycolatopsis, Biotechnology Letters 21: 901–905, 1999, (no month).

* cited by examiner

Primary Examiner—Anthony J. Green
(74) Attorney, Agent, or Firm—Knobbe, Martens, Olson & Bear LLP

(57) ABSTRACT

The present invention provides a biodegradable resin composition with improved biodegradability or with an additional useful function (antibacterial properties), while maintaining the mechanical properties of the biodegradable resin. More specifically, the present invention provides a biodegradable resin composition containing a biodegradable resin such as a polylactic acid polymer and a mamman digestion product such as a mannooligosaccharide. The present invention further provides various biodegradable products produced by molding this biodegradable resin composition into desired shapes.

14 Claims, No Drawings

BIODEGRADABLE RESIN COMPOSITIONS

This application is the U.S. National Phase under 35 U.S.C. §371 of International Application PCT/JP00/08725, filed Dec. 8, 2000, which claims priority to Japanese Patent Application No. 11/349437, filed Dec. 8, 1999. The International Application was not published under PCT Article 21(2) in English.

TECHNICAL FIELD

The present invention relates to biodegradable resin compositions. More specifically, the present invention relates to a biodegradable resin composition that can be produced at reduced cost while maintaining the strength and physical properties of the biodegradable resin; a biodegradable resin composition with improved biodegradability; and a resin composition having an additional useful function.

BACKGROUND ART

Plastics have conventionally been used in a wide variety of fields because they are lightweight, durable and excellent in molding processability. On the other hand, however, plastics decompose very little under natural environmental conditions. Therefore, if disposed of by underground burial, plastics remain almost permanently. If plastics are disposed of by incineration, problems arise such as the generation of toxic gas or damage to the incinerator. The disposal of plastics has been focused on as an environmental problem.

Therefore, with the purpose of protecting the global environment, there have been active attempts to develop biodegradable resins. Biodegradable resins are currently classified into the following groups:

chemically synthesized resins such as polycaprolactone, polylactic acid, polyvinyl alcohol, polybutylene succinate and copolymers thereof;

microbially produced resins such as polyhydroxybutyrate/valerate copolymers; and natural product-derived resins such as acetyl cellulose.

Further, there is a proposal to add starch or processed starch to these resins in order to reduce the cost and improve biodegradability (Japanese Unexamined Patent Publications Nos. 14228/1990, 31333/1991, 248851/1992, 331315/1993 and 207047/1994).

The addition of starch, etc. to biodegradable resin improves biodegradability but severely reduces strength, elongation (%) and like mechanical properties required of the resin composition and moldings thereof, thus causing the problem that the resulting products become fragile. Therefore, in reality, there is a limitation on the proportion of starch to resin and the desired cost reduction has not yet been achieved.

DISCLOSURE OF INVENTION

An object of the present invention is to provide a biodegradable resin composition with improved biodegradability while substantially maintaining the mechanical properties of the biodegradable resin. Another object of the invention is to provide a biodegradable resin composition that can be produced at reduced cost while substantially maintaining the mechanical properties of the biodegradable resin. A further object of the invention is to provide a biodegradable resin composition with an additional useful function while substantially maintaining the mechanical properties of the biodegradable resin.

The present inventors carried out intensive research day and night to achieve the above objects and found that the addition of a mannan digestion product to a biodegradable resin can provide a resin composition with improved biodegradability and furthermore can produce the resin composition and moldings thereof at a lower cost than the single use of biodegradable resin while the mechanical properties of the resin composition and moldings thereof are substantially equivalent to those of the biodegradable resin and moldings thereof. The inventors further found the following specific effect of the resin composition comprising a biodegradable resin and a mannan digestion product: the resin composition can adsorb bacteria to different degrees depending on the mannan digestion product content of the resin composition. The inventors confirmed that various products with antimicrobial barrier properties can be produced by using the above-mentioned resin composition. The bacterial adsorption or adhesion peculiar to the resin composition of the invention is presumably one of the causes of the excellent biodegradability of the resin composition of the invention. The present invention has been developed based on these novel findings. More specifically, the invention provides the following biodegradable resin compositions:

Item 1. A biodegradable resin composition comprising a biodegradable resin and a mannan digestion product.

Item 2. The biodegradable resin composition according to item 1 wherein the biodegradable resin is an aliphatic polyester.

Item 3. The biodegradable resin composition according to item 1 wherein the biodegradable resin is at least one member selected from the group consisting of polyhydroxybutyrate, polylactic acid, polycaprolactone, polybutylene succinate, polybutylene succinate/adipate, polybutylene succinate carbonate, polyvinyl alcohol and cellulose acetate.

Item 4. The biodegradable resin composition according to item 1 wherein the biodegradable resin is a polylactic acid polymer.

Item 5. The biodegradable resin composition according to item 4 wherein the polylactic acid polymer is a a homopolymer or copolymer of lactic acid (polylactic acid), or at least one copolymer of lactic acid and at least one member selected from the group consisting of cyclic lactone, glycolic acid, α-hydroxybutyric acid, α-hydroxyisobutyric acid, α-hydroxyvaleric acid, hydroxypentanoic acid, hydroxycaproic acid, hydroxyheptanoic acid, hydroxyoctanoic acid, ethylene glycol, polyethylene glycol, 1,4-butanediol, succinic acid and sebacic acid.

Item 6. The biodegradable resin composition according to item 1 wherein the biodegradable resin is a polylactic acid.

Item 7. The biodegradable resin composition according to item 1 wherein the biodegradable resin has a number average molecular weight of 20,000 or more and a melting point of 70° C. or higher.

Item 8. The biodegradable resin composition according to item 1 wherein the mannan digestion product is at least one member selected from the group consisting of mannooligosaccharides, galactomannan digestion products and glucomannan digestion products.

Item 9. The biodegradable resin composition according to item 1 wherein the proportion of the mannan digestion product is 0.05 to 40 wt. % relative to 100 wt. % of the biodegradable resin.

Item 10. The biodegradable resin composition according to item 1 wherein the proportion of the mannan digestion product is 1 to 40 wt. % relative to 100 wt. % of the biodegradable resin.

Item 11. The biodegradable resin composition according to item 1 which further comprises a crystal nucleating agent.

Item 12. The biodegradable resin composition according to item 11 wherein the crystal nucleating agent is at least one member selected from the group consisting of talc, boron nitride, calcium carbonate, magnesium carbonate and titanium oxide.

The present invention further provides moldings produced by molding the above biodegradable resin compositions. Such moldings include, for example, biodegradable products and products with antimicrobial barrier properties.

BEST MODE FOR CARRYING OUT THE INVENTION

The mannan digestion product used in the present invention is a compound formed by the digestion of mannan and comprising mannose.

Mannans are polysaccharides mainly consisting of mannose and include those classified into the following classes:

(1) Plant-derived mannans: such mannans include copra meal and flakes from coconut palms, Heacra Palm (a plant of the palm family originating in South Africa), tsukune-imo (a type of yam) mannan, and yamaimo (Japanese yam) mannan.
(2) Glucomannans: polysaccharides comprising glucose and mannose. Such mannans include, for example, mannans from konjac tubers, lily, narcissus and the subterranean stem of Lycoris radiata.
(3) Galactomannans: polysaccharides comprising galactose and mannose. Such mannans include, for example, mannans from locust bean gum, soybean hulls derived from soybean seed coat, tamson gum, tara gum, guar gum, etc.
(4) Other mannans: mannans composed of mannose and at least two other sugars. Such mannans include D-galacto-D-gluco-D-mannan contained in the wood of conifers, and mannan from xanthan gum, etc.

The mannan digestion product used in the present invention can be obtained by digesting various mannans, including those exemplified above, using a suitable method. For example, the following mannan digestion methods are known: biochemical digestion methods directly using polysaccharide-digesting enzymes (mannanase, galacto-mannanase, gluco-mannanase, etc.) or bacteria producing such enzymes; chemical digestion methods using acids or alkalis; and physical digestion methods using high speed stirrers or shearers. A wide variety of mannan digestion products obtained by the above digestion methods can be used in the present invention. The mannan digestion product used in the present invention may be obtained by any of the above digestion methods. However, the mannan digestion product production method is not limited thereto.

The mannan digestion product includes, for example, β-1,4 mannobiose, β-1,4 mannotriose, β-1,4 mannotetraose, methyl β-mannoside and like β-1,4 mannooligosaccharides; β-1,6 galactomannooligosaccharide, β-1,4 galactomannooligosaccharide, α-1,6 galactomannooligosaccharide, α-1,3 galactomannooligosaccharide and like mannooligosaccharides in which one or two galactoses are bonded to β-1,4 mannobiose, β-1,4 mannotriose or β-1,4 mannotetraose to form branched structure; galactomannan digestion products such as oligosaccharides obtained by digestion of copra lees, coffee lees, guar gum or locust bean gum with mannanase; oligosaccharides wherein glucose or maltose is bonded via a β-1,4 bond to mannotriose, mannotetraose or the like; and glucomannan digestion products contained in konjac.

For the sake of convenience, commercially available mannan digestion products may be used in the present invention. Alternatively, for example, galactomannan digestion products can be obtained by extracting galactomannan from the seeds of locust, tara or guar plants by water extraction or alcohol precipitation and then digesting the galactomannan with an acid or an enzyme such as galacto-mannanase and isolating the fraction with a molecular weight of 5,000 to 50,000, preferably 10,000 to 20,000. It is also possible to produce glucomannan digestion products by swelling konjac powder with water to produce a konjac paste and digesting the konjac paste with glucomannanase. These mannan digestion products may be purified or roughly purified products and can be formed into any desired shapes, for examples, aqueous solutions, gels and like liquids, semi-liquids, powders, granules and like solids, or dried products.

It is also possible to use mannan digestion product derivatives as mannan digestion products in the invention. Mannan digestion product derivative means a wide variety of compounds produced by a dehydration condensation reaction for forming a chemical bond between the hemiacetal hydroxyl group of a mannan digestion product and other substance. The other substance bound to the hemiacetal hydroxyl group includes, for example, ribose, ascorbic acid, acrylic acid, styrene, higher alcohols and derivatives thereof, and aliphatic ethers, long-chain epoxy derivatives and the like. Examples of useful mannan digestion product derivatives include isopropylidene derivatives, benzylidene derivatives, butylene glycol derivatives, polyalcohol derivatives and pyrrolidone derivatives.

The biodegradable resin used in the present invention means a resin (plastic) digested by the action of microorganisms or enzymes existing in nature such as the soil or sea. Any known biodegradable resin may be used as the biodegradable resin. Useful resins include, for example, microbially produced resins, natural high molecular weight resins, synthesized high molecular weight resins and natural-synthetic polymer composite resins. Specific examples include aliphatic polyesters such as polycaprolactone, polylactic acid, polyhydroxybutyrate/valerate; polyvinyl alcohols, acetyl cellulose, methyl cellulose, ethyl cellulose, poly-β-hydroxybutyric acid and copolymers thereof; polybutylene succinate and copolymers thereof; and a starch-caprolactone complex.

Aliphatic polyesters and polyvinyl alcohols are preferred. Especially preferred are aliphatic polyesters, which are comparatively low-cost thermoplastic resins with excellent heat resistance and can be melted and molded.

Prototype and commercially available biodegradable plastics composed of polyvinyl alcohols include, for example, "Poval" (trade name, product of Kuraray Co., Ltd.).

Examples of aliphatic polyesters include polyester resins such as a resin comprising 3-hydroxybutyric acid homopolymer or a copolymer of 3-hydroxybutyric acid and other hydroxy fatty acid; polylactic acid resins, polycaproplacton resins, and aliphatic polyesters mainly consisting of glycol and an aliphatic dicarboxylic acid or an anhydride thereof. Prototype and commercially available aliphatic polyester resins include, for example, the resins known by the trade name "Biopol" (polyhydroxybutyrate/hydroxyvalerate copolymer, product of Monsanto Japan, Ltd.), the trade name "Lacea" (polylactic acid, product of Mitsui Chemicals, Inc.), the trade name "Lacty" (polylactic acid, product of Shimadzu Corporation), the trade name "EcoPLA" (polylactic acid, product of Cargill Dow Polymers, LLC), the trade name "Iupec" (polybutylene succinate carbonate, product of Mitsubishi Gas Chemical Company, Inc.), the trade name "Lunare SE" (polyethylene succinate, product of Nippon Shokubai Co., Ltd.), the trade name "Bionolle #1000" (polybutylene succinate, product of Showa Highpolymer Co., Ltd.), the trade name "Bionolle #3000" (polybutylene succinate/adipate copolymer, product of Showa Highpolymer Co., Ltd.), and the trade names "Celgreen PH" and "Celgreen P-HB" (polycaprolactones, products of Daicel Chemical Industries, Ltd.).

Also usable are blends prepared by mixing these aliphatic polyesters and starch. Commercially available blend products include, for example, "Mater-Bi" manufactured by The Nippon Synthetic Chemical Industry Co., Ltd. and "Novon" manufactured by Chisso Corporation. The resins mentioned above may be used in mixtures of two or more.

Of these aliphatic polyesters, especially preferred are aliphatic polyesters consisting chiefly of glycol and an aliphatic dicarboxylic acid or an anhydride thereof, and polylactic acid polymers.

Examples of useful glycols include ethylene glycol, 1,4-butanediol, 1,8-hexanediol, decamethylene glycol, neopentylglycol and 1,4-cyclohexane dimethanol. These glycols may be used in combinations of two or more. Examples of aliphatic carboxylic acids (or anhydrides thereof) include succinic acid, adipic acid, suberic acid, sebacic acid, dodecanoic acid, succinic anhydride and anhydrous adipic acid. These acids may be used in combinations of two or more. Useful aliphatic polyesters further include high molecular weight aliphatic polyesters produced by a coupling reaction using diisocyanate, oxazoline, diepoxy compounds or other coupling agents.

Examples of polylactic acid polymers include homopolymers or copolymers comprising lactic acid as a monomer component (polylactic acids), copolymers of lactic acid and one or more kinds of compounds selected from: cyclic lactones such as ε-caprolactone; oxyacids such as glycolic acid, α-hydroxybutyric acid, α-hydroxyisobutyric acid, α-hydroxyvaleric acid, hydroxypentanoic acid, hydroxycaproic acid, hydroxyheptanoic acid and hydroxyoctanoic acid; glycols such as ethylene glycol, polyethylene glycol and 1,4-butanediol; dicarboxylic acids such as succinic acid and sebacic acid. Random copolymers and/or block copolymers may be used as the copolymer. Preferred are polylactic acids.

Useful polylactic acids include lactic acid homopolymers. Also usable are copolymers prepared by copolymerization of lactic acid with a polyethylene glycol having a molecular weight of 600 or more in a molar proportion of 0.1 to 10%, an aliphatic polyester in a molar proportion of 0.1 to 80% or polycaprolactone in a molar proportion of 0.1 to 80%. Preferable are copolymers prepared by copolymerization of lactic acid with a polyethylene glycol having a molecular weight of 2,000 to 20,000 in a molar proportion of 0.1 to 10%, an aliphatic polyester in a molar proportion of 0.1 to 50% or polycaprolactone in a molar proportion of 0.1 to 50%.

Lactic acid is a stereoisomeric monomer and exists as L-lactic acid and D-lactic acid. Either isomer or a mixture of these isomers may be used as lactic acid in the invention. It is preferable to have an optical purity of at least 60%, more preferably 80% or higher. When the optical purity is low, the polymer tends to have low crystallinity, resulting in low heat resistance and inferior mechanical properties. When high elasticity is desired, the proper proportion of L-lactic acid is 70% or more, preferably 90% or more.

The biodegradable resins used in the present invention may be prepared by conventional methods. For example, polylactic acids can be prepared by known methods such as direct dehydration and polycondensation of lactic acid; or a method comprising dehydration of lactic acid into lactide and then subjecting the lactide to ring opening polymerization. It is convenient to use commercially available biodegradable resins. Examples of prototype and currently commercially available biodegradable plastics include, in addition to the already mentioned plastics, those known by the trade name "Biogreen" (polyhydroxybutyrate, product of Mitsubishi Gas Chemical Company, Inc.), the trade name "Cornpol" (modified starch, product of Japan Corn Starch Co., Ltd.), the trade name "Celgreen PCA" (cellulose acetate, product of Daicel Chemical Industries, Ltd.), the trade name "Dolon CC" (chitosan/cellulose/starch, product of Aicello Chemical Co., Ltd.), and the trade name "Celgreen" (cellulose acetate-based material, product of Daicel Chemical Industries, Ltd.).

From the viewpoint of mechanical strength, it is preferable for the biodegradable resin of the invention to have a number average molecular weight of about 20,000 or more, preferably 40,000 or more, more preferably 60,000 or more, even more preferably 100,000 or more. From the viewpoint of heat resistance, it is preferable that the biodegradable resin have a melting point of 70° C. or higher, more preferably 100° C. or higher, even more preferably about 160° C.

The proportions of the biodegradable resin and the mannan digestion product vary depending on the kinds of resin and product. Therefore, it is difficult to specifically define the proportions. Generally, the degradation rate and functions of the biodegradable resin composition such as bacterial adsorption can be adjusted by changing the proportion of mannan digestion product to biodegradable resin. The biodegradability and bacterial adsorption properties can be enhanced by increasing the proportion of mannan digestion product. The resulting composition can suitably be used for objects requiring antimicrobial barrier properties and rapid degradability. When high strength is required, it is desirable to use galactomanno-oligosaccharide containing 80% or less of mannose as a mannan digestion product. The preferable proportional ranges of the components greatly differ depending on the intended use of the resin composition. The proportions can suitably be decided in view of the balance between physical properties such as strength and functions such as bacterial adsorption and biodegradability.

From the viewpoint of mechanical strength, it is adequate that the proportion of the mannan digestion product be usually 0.05 to 40 wt. %, preferably 0.5 to 10 wt. %, more preferably 1 to 5 wt. %, relative to 100 wt. % of the biodegradable resin.

From the viewpoints of degradation rate (biodegradability) and bacterial adsorption, it is adequate that the proportion of the mannan digestion product be usually 1 to 40 wt. %, preferably 5 to 20 wt. %, more preferably 5 to 10 wt. %, relative to 100 wt. % of the biodegradable resin.

With the purpose of functional improvement or addition of a new function, additives may be incorporated into the biodegradable resin composition in any proportions. Such additives include, for example, pigments, antioxidants, antistatic agents, matting agents, antiaging agents, fluorescent brighteners, UV absorbents, UV stabilizers, lubricants, fillers, carbon black, thickeners, chain extenders, crosslinking agents, crystal nucleating agents, plasticizers, stabilizers and viscosity stabilizers. The addition of a crystal nucleating agent such as talc, boron nitride, calcium carbonate, magnesium carbonate or titanium oxide is especially preferred because it promotes crystallization during the thermoforming process and improves the heat resistance and mechanical strength of the molding. As long as the effects of the invention are not adversely affected, starch and processed starch, pectin, chitin, chitosan, alginic acid or a salt thereof, xylose, cellulose or a cellulose derivative such as carboxymethylcellulose may also be added.

The biodegradable resin composition of the invention can be prepared by mixing the above biodegradable resin and the mannan digestion product with heating.

The method for mixing the biodegradable resin and the mannan digestion product is not specifically limited. Useful methods include a method comprising adding a mannan digestion product to a biodegradable resin while heating the resin, and mixing using a kneader such as a roll mill; a method comprising melting and kneading a mannan digestion product and a biodegradable resin in an extruder; blow molding; and foam molding. The heating temperature is usually in the range of 120° C. to 250° C. From the viewpoint of biodegradability, the range of 120° C. to 160° C. is preferable.

The biodegradable resin composition obtained can be processed, for example, by a method comprising heating and injecting the composition into an extrusion mold or can be dissolved in a solvent and formed into membranes, sheets, films or nets.

The biodegradable resin composition of the invention can thus be formed into various shapes such as films, sheets, plates, foams and bottles. Therefore, the composition can suitably be used for the following variety of purposes: packaging materials such as trays, foam trays, stretch films, shrink films, beverage bottles, and blister packaging for toothbrushes; agricultural and gardening materials such as greenhouse films, tunnel films, multi-purpose films, vegetation films, seedling pots, seed strings, and covering materials for fertilizers and pesticides; civil engineering materials such as vegetation nets, heavy bags, construction molds, civil engineering sheets and grass stakes; fishery materials such as fishing nets, laver nets, cultivation nets, fishing lines and fishing bait bags; waterproof sheets and packaging materials such as paper diapers and sanitary products; medical appliances such as syringes; commodities and sundry articles such as garbage bags, shopping bags, plastic bags, drain nets, laminated containers for dishes, spoons and forks, binding tapes, toothbrush and razor handles, shampoo and conditioner bottles, cosmetic bottles, pens and markers; medical materials such as osteosynthesis materials, suture materials and wound covering materials; air cleaning filters; magnetic cards, labels, mold release papers, golf tees, etc.

The biodegradable resin composition of the invention, as it is or after being formed into the desired shape, can be used as a blend by adding the composition to a suitable biodegradable resin. This use can reduce the costs of conventional biodegradable resins and biodegradable resin products (moldings) prepared using such resins and also improve biodegradability. Furthermore, new functions (antimicrobial barrier properties) can be imparted to conventional biodegradable resins.

EXAMPLES

Examples are given below to illustrate the invention in more detail, but it is to be understood that the invention is not limited thereby.

Example 1

Galactomannooligosaccharide (product of C.P.R Co., Ltd.) was used as a mannan digestion product. Polylactic acid ("Lacty #9000" manufactured by Shimadzu Corporation) was used as a biodegradable resin. The polylactic acid, talc and galactomanno-oligosaccharide were mixed at a weight ratio of 50:40:10 and kneaded in a Brabender Plastograph at 120° C. for 30 minutes. Polylactic acid ("Lacty #1012" manufactured by Shimadzu Corporation) was further added to the mixture at a weight ratio of 1:1 and kneaded in a high-speed mixer for 30 minutes. The resulting mixture was melted by heating and formed into pellets using a test extruder. The pellets were molded into a sheet with a thickness of about 500 $\mu$m ["Lacty #1012": ("Lacty #9000" 50%/talc 40%/galactomanno-oligosaccharide 10%) =50:50]. This sheet was cut to a size of 100 mm×100 mm and tested.

Comparative Example 1

A resin composition was prepared in the same manner as in Example 1 except that talc was used in place of galactomannooligosaccharide, and molded into a sheet ["Lacty #1012": ("Lacty #9000" 50%/talc 50%) =50:50].

Comparative Example 2

A resin composition was prepared in the same manner as in Example 1 except that corn starch was used in place of talc and galactomanno-oligosaccharide, and molded into a sheet ["Lacty #1012": ("Lacty #9000" 50%/corn starch 50%) =50:50].

Experiment Examples

The sheets of the biodegradable resin compositions prepared in Example 1 and Comparative Examples 1 and 2 were measured with respect to the following parameters to evaluate their physical properties and functionalities:

1. Mechanical Properties

Fracture strength and fracture elongation were measured in accordance with JIS K-7113 at 17° C. at a humidity of 50%. Table 1 shows the results. Fracture strength and fracture elongation were calculated from the following formulas:

Fracture strength $(N/cm^2)$=Fracture load $(N)$/Cross section $(cm^2)$

Fracture elongation (%)=[(Fracture elongation−Span length)/Span length]×100

TABLE 1

|  | Example 1* | Comp. Ex. 1* | Comp. Ex. 2 |
|---|---|---|---|
| Thickness (mm) | 0.503 | 0.491 | 0.504 |
| Fracture strength $(N/cm^2)$ | 4448.9 | 4753.5 | 3364.0 |
| Fracture elongation (%) | 1.4 | 1.8 | 1.5 |

*In Table 1, Example 1 and Comparative Example 2 represent the average of 9 samples, and Comparative Example 1 represents the average of 5 samples.

These results confirm that the addition of a mannan digestion product to a biodegradable resin hardly affects the mechanical properties of the biodegradable resin such as fracture strength and fracture elongation.

2. Evaluation of Biodegradability

Flat plate films (10 cm×10 cm×0.2 cm thick) were prepared in accordance with the processes described in Example 1 and Comparative Example 1. Five sheets each of these films were buried 1) in activated sludge and 2) in soil. The biodegradability was evaluated from changes in weight. Reduction in weight (weight loss %) indicates the degree of biodegradation of the flat plate film. Table 2 shows the results. In Table 2, Example 1 represents the average of 9 samples, and Comparative Example 1 represents the average of 5 samples.

TABLE 2

| | Weight loss % | |
|---|---|---|
| | Example 1 | Comparative Example 1 |
| 1) Biodegradability in activated sludge (sewage treatment plant) | | |
| Start (0 hour) | 0 | 0 |
| 1 month later | 86.1 | 30.1 |
| 2 months later | 91.6 | 63.2 |
| 3 months later | 98.1 | 78.5 |
| 2) Biodegradability in soil | | |
| Start (0 hour) | 0 | 0 |
| 1 month later | 68.6 | 16.4 |
| 2 months later | 88.4 | 40.9 |
| 3 months later | 92.1 | 54.3 |

These results confirm that the addition of a mannan digestion product to a biodegradable resin significantly improves the biodegradability of the resin.

3. Evaluation of Bacterial Adsorption Capability

Flat plate films (10 cm×10 cm×0.2 cm thick) were prepared in accordance with the processes described in Example 1 and Comparative Example 1. Five sheets each of these films were placed into 500 ml flasks containing 100 ml of a bacteria culture medium (Escherichia coli, bacteria count: $2×10^8$ bacteria/ml) and shaken. Then, the films were taken out and the bacterial count in the medium was determined. The adsorption % was determined from the reduction in bacterial count. Table 3 shows the results. In Table 3, Example 1 represents the average of 9 samples, and Comparative Example 1 represents the average of 5 samples.

TABLE 3

| | Bacterial adsorption % | |
|---|---|---|
| | Example 1 | Comparative Example 1 |
| Start (0 hour) | 0 | 0 |
| 10 minutes later | 27.8 | 0.2 |
| 30 minutes later | 84.5 | 0.9 |
| 60 minutes later | 90.9 | 4.3 |

The results confirm that the biodegradable resin composition of the invention containing a mannan digestion product in addition to a biodegradable resin has greatly improved bacterial adsorption capability.

INDUSTRIAL APPLICABILITY

The biodegradable resin composition and moldings thereof according to the present invention rapidly decompose completely in nature such as in soil or in water by the action of enzymes or bacteria without generating toxic substances. Therefore, after use, the biodegradable resin composition and moldings thereof can be disposed of, as they are or after grinding, by underground burial or underwater disposal.

Especially, the biodegradable resin composition of the invention prepared using a polylactic acid polymer as a biodegradable resin is transparent and useful as a biodegradable plastic (biodegradable product) with excellent toughness, flexibility and impact resistance. Therefore, this resin composition can suitably be used for various purposes especially requiring strength, such as beverage bottles, shampoo and conditioner bottles, cosmetic bottles and like polyethylene terephthalate (PET) bottles; civil engineering materials such as construction molds and piles; fishery materials such as fishing nets and fishing lines; agricultural materials for vegetation and plastic greenhouses; vegetation materials; laminated containers for spoons and forks; toothbrush and razor handles; medical materials such as osteosynthesis materials and suture materials; sports goods such as golf tees; writing supplies such as pencil cases and plastic sheets laid under writing paper; clothing and industrial textile products; sanitation and medical related materials such as diapers, sanitary products, gauzes and patches.

By adjusting the proportion of the mannan digestion product, the biodegradable resin composition of the invention is further provided with bacterial adsorption capability. For example, if using textile products (clothing) made from such a biodegradable resin composition, bacteria once adsorbed on the products are difficult to desorb, whereby the dispersion of bacteria can be prevented. Such products are useful, for example, as antimicrobial barrier textile products effective for the prevention of nosocomial infection.

By adding a mannan digestion product to a biodegradable resin, the present invention can provide a biodegradable plastic (a biodegradable product) at a lower cost than single use of the biodegradable resin, while substantially maintaining the mechanical properties at the level achieved by a biodegradable plastic (a biodegradable product) composed of the biodegradable resin alone.

What is claimed is:

1. A biodegradable resin composition comprising a biodegradable resin and a mannan digestion product with the proviso that the biodegradable resin is not line cellulose.

2. The biodegradable resin composition according to claim 1 wherein the biodegradable resin is an aliphatic polyester.

3. The biodegradable resin composition according to claim 1 wherein the biodegradable resin is at least one member selected from the group consisting of polyhydroxybutyrate, polylactic acid, polycaprolactone, polybutylene succinate, polybutylene succinate/adipate, polybutylene succinate carbonate, polyvinyl alcohol and cellulose acetate.

4. The biodegradable resin composition according to claim 1 wherein the biodegradable resin is a polylactic acid polymer.

5. The biodegradable resin composition according to claim 4 wherein the polylactic acid polymer is a homopolymer or copolymer of lactic acid, or at least one copolymer of lactic acid and at least one member selected from the group consisting of cyclic lactone, glycolic acid, α-hydroxybutyric acid, α-hydroxyisobutyric acid, α-hydroxyvaleric acid, hydroxypentanoic acid, hydroxycaproic acid, hydroxyheptanoic acid, hydroxyoctanoic acid, ethylene glycol, polyethylene glycol, 1,4-butanediol, succinic acid and sebacic acid.

6. The biodegradable resin composition according to claim 1 wherein the biodegradable resin is a polylactic acid.

7. The biodegradable resin composition according to claim 1 wherein the biodegradable resin has a number average molecular weight of 20,000 or more and a melting point of 70° C. or higher.

8. The biodegradable resin composition according to claim 1 wherein the mannan digestion product is at least one member selected from the group consisting of mannooligosaccharides, galactomannan digestion products and glucomannan digestion products.

9. The biodegradable resin composition according to claim 1 wherein the proportion of the mannan digestion product is 0.05 to 40 wt. % relative to 100 wt. % of the biodegradable resin.

10. The biodegradable resin composition according to claim 1 wherein the proportion of the mannan digestion product is 1 to 40 wt. % relative to 100 wt. % of the biodegradable resin.

11. The biodegradable resin composition according to claim 1 which further comprises a crystal nucleating agent.

12. The biodegradable resin composition according to claim 11 wherein the crystal nucleating agent is at least one member selected from the group consisting of talc, boron nitride, calcium carbonate, magnesium carbonate and titanium oxide.

13. A biodegradable product produced by molding the biodegradable resin composition of claim 1.

14. A product with antimicrobial barrier properties produced from the biodegradable resin composition of claim 1.

* * * * *